United States Patent [19]
Hafele

[11] 3,862,698
[45] Jan. 28, 1975

[54] BLOW MOLDED ARTICLE OF MANUFACTURE

[75] Inventor: Robert X. Hafele, Overland Park, Kans.

[73] Assignee: Ethyl Development Corporation, Kansas City, Mo.

[22] Filed: June 1, 1973

[21] Appl. No.: 365,954

[52] U.S. Cl.............. 215/1 C, 215/31, 264/94, 264/159
[51] Int. Cl............................ B65d 1/02
[58] Field of Search ......... 215/1 C, 31, 32; 264/159

[56] References Cited
UNITED STATES PATENTS

| | | | |
|---|---|---|---|
| 2,790,994 | 5/1957 | Cardot | 264/159 X |
| 3,212,663 | 10/1965 | Greenwell | 215/31 |
| 3,310,620 | 3/1967 | Martelli | 264/159 X |
| 3,335,891 | 8/1967 | Bailey | 215/31 |
| 3,409,710 | 11/1968 | Klygis | 264/159 X |
| 3,432,586 | 3/1969 | Stenger | 264/159 X |
| 3,456,290 | 7/1969 | Ruekberg | 264/94 X |
| 3,793,421 | 2/1974 | Paubandt | 264/157 X |

FOREIGN PATENTS OR APPLICATIONS 1,436,030  3/1966  France ..................... 215/1 C Primary Examiner—Donald F. Norton
Attorney, Agent, or Firm—Donald L. Johnson; John F. Sieberth; Edgar E. Spielman, Jr.

[57] ABSTRACT

In a hollow plastic, integrally formed, blow molded article of manufacture, wherein a pair of normally open-mouthed containers are connected in a mouth-to-mouth relationship by a waist ring. The waist ring and the container mouths both have annular inwardly extending webs which connect to form annular grooves between the waist ring and mouths which provide, upon separating the containers by cutting at the grooves, finished containers requiring no further finishing operations.

14 Claims, 3 Drawing Figures

PATENTED JAN 28 1975 3,862,698
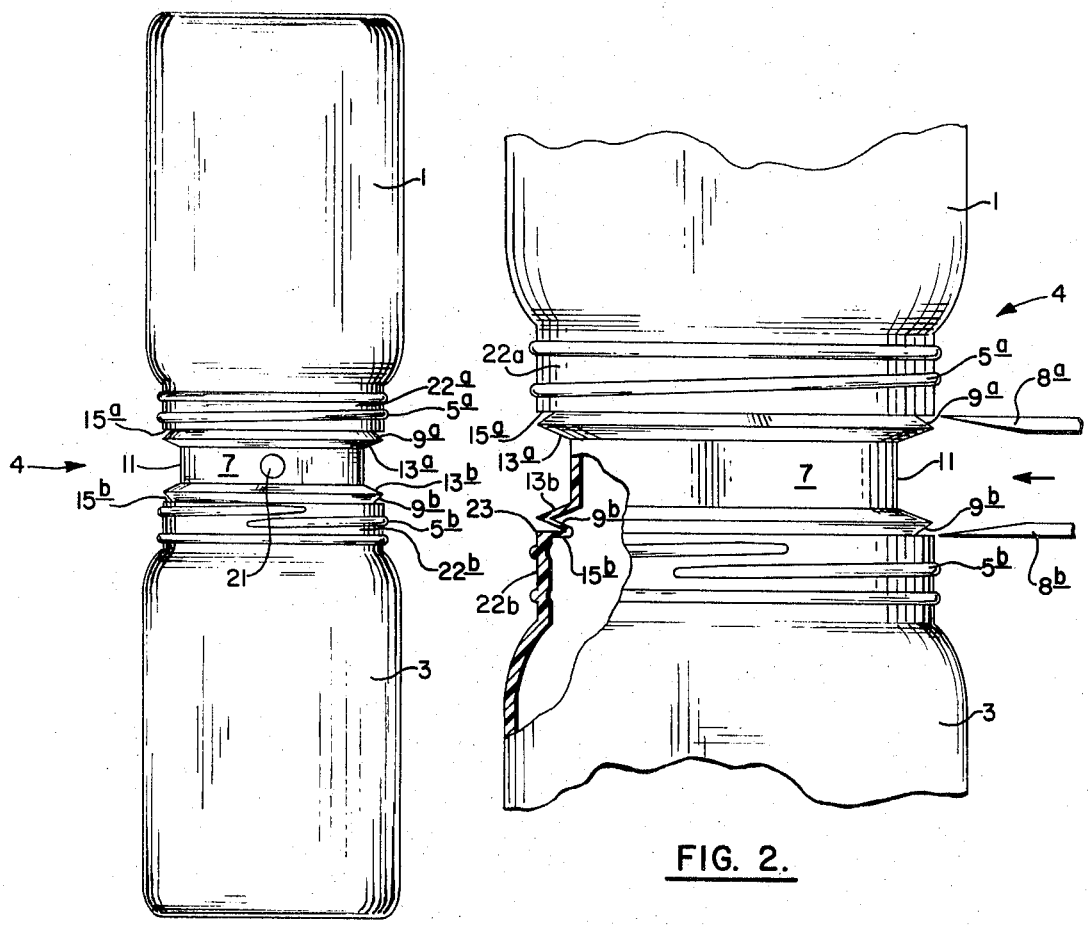
FIG. 1.
FIG. 2.
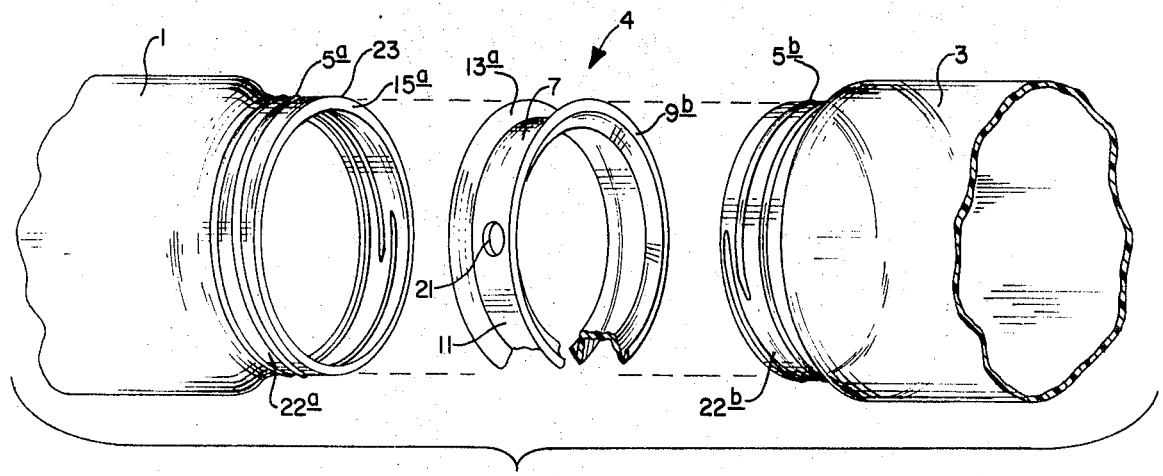
FIG. 3.

BLOW MOLDED ARTICLE OF MANUFACTURE

BACKGROUND OF THE INVENTION

Tandem blow molds are known which have a plurality of cavities in which there may be simultaneously blown a hollow article which will yield, after cutting and trimming, two or more articles for each blowing sequence.

When it is desired to blow bottles or similar containers in a tandem mold, the mold is generally provided with axially aligned body cavities joined together by a central neck or waist cavity. A tubular parison of thermoplastic material that has been softened sufficiently to allow expansion under internal pressure is clamped and sealed at its opposite ends between a pair of mold sections. The cavities in the mold surround the parison. A blow needle located in the central neck or waist cavity is then introduced and pressurized air is admitted into the clamped-off section of the tubular parison to expand the section to the configuration of the mold cavities to form a container in each cavity joined at the neck portions thereof. The blow needle is withdrawn, the tandem mold is opened and the blown and integrally joined containers are removed.

After the containers have been removed, they are necessarily separated by severing or cutting a section of the plastic material in the area of the container necks. The removed material forms no part of either of the containers and it is thus waste material which may be ground and recycled to provide extra plastic for forming subsequent parisons.

After the containers have been separated, it is also generally necessary to perform several operations to finish the containers. For example, the severing operation may be followed by a reaming operation by which the necks of the containers are reamed out in a conventional manner. The lip or rim of each container can also be faced off to a smooth and flat finish. The finishing operations are especially necessary in the cases where the cutting is performed at the container mouth as the mouth must be finished so as to receive a closure or cap which will provide a leak proof seal. These finishing operations, however, add to the cost of the product as they use manufacturing time and require specialized equipment.

It is therefore an object of this invention to provide a blow molded article of manufacture produced in tandem molds which, after severing, does not require any additional finishing operations and still yields a container which can accept a closure which maintains a tight seal.

THE INVENTION

This invention relates to a hollow plastic, integrally formed, blow molded article of manufacture which comprises a pair of normally opened mouthed containers and a waist ring connecting the containers in a mouth-to-mouth relationship. The connection between each end of the waist ring and the respective mouths of the containers forms novel, inwardly extending, annular grooves at the points of connection which provide a point for separating the containers from the waist ring by cutting and/or breaking. The separated containers are finished containers requiring no further neck or lip finishing operations thereon. The annular, inwardly extending grooves may be formed by the connection of annular, inwardly extending waist webs at each end of the waist ring to respective annular, inwardly extending sealing webs at the outer extend of the mouth or lip of each container.

These and other features of the invention contributing to its use and economy will be more fully understood from the following description of a preferred embodiment of this invention when taken in connection with the accompanying drawings wherein identical numerals refer to identical parts and in which:

FIG. 1 is a side elevational view of a preferred embodiment of the invention;

FIG. 2 is a fragmentary side elevational view of the embodiment of FIG. 1 showing the position of severing knives for separating the containers; and FIG. 3 is a fragmentary exploded view of the embodiment of FIG. 1 after the containers have been separated by cutting with the knives shown in FIG. 2.

Referring now to FIG. 1, it can be seen that the hollow plastic article of manufacture, designated generally by the numeral 4, comprises a top container 1, bottom container 3 and waist ring 7. Containers 1 and 3 are integrally connected at their mouths or lips in a mouth-to-mouth relationship by waist ring 7. Aperture 21 in waist ring 7 is formed by insertion of a blow molding needle as will be described hereinafter. Containers 1 and 3 are, in this embodiment, wide-mouthed containers having neck portions 22a-22b which are provided with outwardly projecting helical threads 5a and 5b, respectively, at their mouths. It is to be understood that containers having other configurations with or without threaded neck portions are contemplated within the scope of this invention. Exemplary of other containers which are suitable are wide or narrow-mouthed containers having annular snap-on beads for receipt of snap-on caps.

From FIGS. 1 and 2 it can be seen that waist ring 7 has inwardly extending waist webs 9a and 9b at each end of waist ring 7. These waist webs are integrally connected to inwardly extending annular sealing webs 15a and 15b which are integrally formed with the lips 23 of containers 1 and 3, respectively. The sealing webs shown in FIGS. 1 and 2 are in a plane substantially perpendicular to the longitudinal axis of containers 1 and 3. Waist webs 9a and 9b form acute angles with sealing webs 15a and 15b, respectively. Preferred acute angles are from about 3° to about 85°.

Although sealing webs 15a and 15b are shown in the drawings to be in a plane substantially perpendicular to the center axis of containers 1 and 3, it is to be understood that sealing webs 15a and 15b can be angled upwardly with respect to the perpendicular plane if desired. In all instances, the container provided after separation from the waist ring will provide a mouth or lip which accepts a closure and is capable of maintaining a leak-proof seal without further finishing steps being required. If the sealing web of a container is upwardly angled with respect to the plane of the lip, the sealing web will be compressed downwardly by the underside of a flat top closure thus insuring a tight sealing surface with a large area. The sealing surface will be substantially the same and will give a tight leak-proof fit if the sealing web of the container is in the perpendicular plane mentioned above.

The width of the inwardly projecting sealing webs 15a and 15b may be of any convenient width. For example, when the sealing web of the container is in a plane perpendicular to the center axis of the container and the container has a mouth measuring about 3 inches, a sealing web width of about 0.080 inches is suitable. The width of waist webs 9a and 9b may be any suitable width which will provide the necessary depth for the groove to readily accept the cutting knives 8a and 8b.

The thickness of waist webs 9a and 9b and sealing webs 15a and 15b at their juncture is generally from about 0.01 inches to about 0.12 inches so that cutting at the juncture of these webs can be easily achieved.

It can also be seen in FIGS. 1 and 2 that waist ring 7 has inwardly extending inner annular flanges 13a and 13b which terminate at middle cylindrical portion 11 of waist ring 7. Such an arrangement is preferred as it forms a channel around waist ring 7 in which roller devices can be positioned so that these devices may align and rotate the article to aid severing knives 8a and 8b in separating the containers 1 and 3 from waist ring 7. It is to be understood, however, that such is only preferred and that other configurations which do not interfere with the cutting by the knives are contemplated within the scope of this invention.

After the blow molding operation has been completed, the blow molded article may be removed from the mold and positioned in a cutting apparatus to separate the containers from the waist ring. FIG. 2 shows the position of severing knives 8a and 8b just prior to their insertion into the annular grooves formed by waist webs 9a and 9b and sealing webs 15a and 15b. Not shown are rollers which can be used to engage waist ring 7 at middle cylindrical portion 11. In operation, severing blades 8a and 8b are inserted into the grooves and article 4 is rotated by means of the previously mentioned rollers until a sufficient cut has been made to insure separation. If the plastic is frangible, the cut need not be a full 360°, but rather it can be to a lesser extent as the remaining portion can be merely broken off. If the plastic is not frangible, the cut should be a full 360° cut.

After cutting, the three components are containers 1 and 3 and waist ring 7, as in shown in FIG. 3. Both container 1 and 3 are provided with an integral, annular, inwardly extending sealing webs 15a and 15b. As before mentioned, no further finishing of the bottle neck is required.

A further advantage of the configuration of the article of manufacture of this invention is that the annular grooves formed by the waist webs and the sealing webs also function to aid in guiding either the knives or the article so that an accurate and precise cut is possible. For example, if the article is allowed "to float," i.e., have limited axial motion, the severing blades will still cut accurately as they will be guided to the bottom of the groove by the angled waist webs 9a and 9b.

The article of manufacture and the resultant container of this invention may be made of any suitable plastic material of construction. Various thermoplastic materials, e.g., high, medium or low density polyethylene, polypropylene, polystyrene, styrene-acrylonitrile polymers, polycarbonates, nylon, acetal polymers or copolymers, polyvinyl chloride polymers or copolymers, or the like, are suitable.

What is claimed is:

1. A hollow, plastic, blow-molded, integrally formed article of manufacture comprising two normally open-mouthed containers and a waist ring, said containers each having a cylindrical neck portion which has an outwardly projecting, helical thread on its exterior surface and said waist ring connecting the two containers at their mouths so that the mouths are adjacent and opposite and so that each connection is by means of an annular, inwardly extending groove.

2. The article of claim 1 wherein the article is made from a frangible plastic.

3. The article of claim 1 wherein the groove is defined by an annular, inwardly extending waist web on the waist ring and an annular, inwardly extending sealing web at the outer extent of each mouth.

4. The article of claim 3 wherein the sealing webs are in a plane substantially perpendicular to the longitudinal axis of the containers.

5. The article of claim 4 wherein the waist webs form an acute angle with the sealing webs.

6. The article of claim 5 wherein the acute angle is from about 3° to about 85°.

7. The article of claim 5 wherein the waist ring has integral with the outer edge of the waist webs inwardly extending flanges terminating at a middle cylindrical portion of the waist ring.

8. The article of claim 7 wherein the angle formed by the flanges and waist webs is an acute angle.

9. The article of claim 8 wherein the acute angle is from about 15° to about 87°.

10. A hollow, plastic, blow-molded, integrally formed article of manufacture comprising two normally open-mouthed containers and a waist ring connecting the two containers at their mouths so that their mouths are adjacent and opposite, and so that each connection is by means of an annularly extending groove, said groove being defined by an annular, inwardly extending waist web on the waist ring and an annular, inwardly extending sealing web at the outer extent of each mouth with said sealing webs being in a plane substantially perpendicular to the longitudinal axis of the containers and forming an acute angle with the said waist webs, and with the waist ring having integral with the outer edge of the waist webs inwardly extending flanges terminating at a middle cylindrical portion of the waist ring.

11. The article of claim 10 wherein the article is made of frangible plastic.

12. The article of claim 10 wherein the acute angle is from about 3° to 85°.

13. The article of claim 10 wherein the angle formed by the flanges and the waist web is an acute angle.

14. The article of claim 13 wherein the acute angle is from about 15° to about 87°.

* * * * *